US008583487B2

(12) United States Patent
Amini et al.

(10) Patent No.: US 8,583,487 B2
(45) Date of Patent: *Nov. 12, 2013

(54) METHOD AND SYSTEM FOR MEDIA INITIALIZATION VIA DATA SHARING

(75) Inventors: Ali Nasiri Amini, Sunnyvale, CA (US); Michael Jan Grebeck, San Francisco, CA (US); Aaron E. Flores, Mountain View, CA (US); Alireza Darvish, Sunnyvale, CA (US); Hans Marius Holtan, San Jose, CA (US); Robert Alden Luenberger, Los Altos, CA (US)

(73) Assignee: AOL Advertising Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/618,164

(22) Filed: Sep. 14, 2012

(65) Prior Publication Data
US 2013/0073380 A1   Mar. 21, 2013

Related U.S. Application Data

(63) Continuation of application No. 12/314,499, filed on Dec. 11, 2008, now Pat. No. 8,301,497.

(60) Provisional application No. 61/045,914, filed on Apr. 17, 2008.

(51) Int. Cl.
*G06Q 30/00* (2012.01)
*G06Q 90/00* (2006.01)

(52) U.S. Cl.
USPC .................. 705/14.46; 705/14.4; 705/14.73; 705/14.66; 705/14.6; 705/14.52; 705/14.45; 705/14.43; 705/14.42

(58) Field of Classification Search
USPC ............................................................ 705/14
See application file for complete search history.

(56) References Cited

U.S. PATENT DOCUMENTS

| 8,301,497 | B2* | 10/2012 | Amini et al. ............... 705/14.4 |
| 2001/0020236 | A1* | 9/2001 | Cannon ............................. 707/1 |
| 2003/0105693 | A1* | 6/2003 | Conkwright et al. ........... 705/35 |
| 2003/0149938 | A1* | 8/2003 | McElfresh et al. ........... 715/517 |
| 2006/0004628 | A1* | 1/2006 | Axe et al. ....................... 705/14 |
| 2006/0074630 | A1* | 4/2006 | Chelba et al. .................... 704/9 |
| 2006/0117077 | A1* | 6/2006 | Kiiveri et al. ................ 708/200 |
| 2006/0212350 | A1* | 9/2006 | Ellis et al. ....................... 705/14 |
| 2006/0235783 | A1* | 10/2006 | Ryles et al. ..................... 705/35 |

(Continued)

OTHER PUBLICATIONS

International Search Report and the Written Opinion of the International Search Authority corresponding to PCT/US09/40670, dated Jan. 20, 2011, 10 pages.

*Primary Examiner* — Victoria Vanderhorst
*Assistant Examiner* — Vincent Cao
(74) *Attorney, Agent, or Firm* — Finnegan, Henderson, Farabow, Garrett & Dunner LLP

(57) ABSTRACT

A method, apparatus, and computer-readable medium estimate media performance on advertising space inventory. The method selects at least one media cell that shares one or more common attributes with a target media cell. The method subsequently estimates mean revenue per impression (RPI) of the selected media cell, and then defines an initial estimate of a RPI of the target media cell based on the estimated RPI of the selected cell. The method computes the RPI of the target media cell by combining the initial RPI estimate for the target media cell with performance data associated with the target media cell.

20 Claims, 8 Drawing Sheets

(56) References Cited

U.S. PATENT DOCUMENTS

| | | | |
|---|---|---|---|
| 2007/0100724 A1* | 5/2007 | Hollas et al. | 705/36 R |
| 2008/0065479 A1 | 3/2008 | Tomlin et al. | |
| 2008/0091524 A1 | 4/2008 | Yan et al. | |
| 2008/0294577 A1 | 11/2008 | Agarwal | |
| 2009/0070194 A1 | 3/2009 | Song | |
| 2009/0099904 A1 | 4/2009 | Affeld et al. | |

* cited by examiner

METHOD AND SYSTEM FOR MEDIA INITIALIZATION VIA DATA SHARING

CROSS-REFERENCE TO RELATED APPLICATIONS

This application is a continuation of and claims the benefit of priority to U.S. patent application Ser. No. 12/314,499, filed Dec. 11, 2008 now U.S. Pat. No. 8,301,497, which claims the benefit of priority to U.S. Provisional Patent Application No. 61/045,914, filed Apr. 17, 2008. The contents of the above-referenced applications are expressly incorporated herein by reference to their entireties.

DESCRIPTION OF THE INVENTION

1. Field of the Invention

The present disclosure relates to placement of media on advertising space inventory on an electronic medium, and more specifically, to estimating media performance on the advertising space inventory.

2. Background of the Invention

Online advertising has become a billion dollar industry in today's digital content-driven economy. The portability of digital content using mobile computing devices, such as smart phones and media players, has expanded the reach of online advertisers beyond traditional personal computer users. Advertisers and publishers of online content, however, desire accurate estimates of the performance of advertisements, such as the performance of a particular advertisement associated with a specific location on a website, in order to ensure effective ad placement.

Accurate and cost-effective performance estimates for a particular advertisement on a specific location of a particular website may rely on historical performance data associated with the particular advertisement or the particular website. For example, performance estimates of the particular advertisement on the specific website location can be based on that advertisement's performance on similar websites, or alternatively, on the performance of similar advertisements on the specific location of the particular website. While these techniques are cost-effective and provide reasonable performance estimates, they are alone insufficient to estimate the performance of an advertisement or website that lack historical performance data.

In such instances, data sharing can be coupled with historical data to provide a cost-effective and accurate estimate of advertisement performance on a segment of advertising space inventory. But, data sharing techniques may require some knowledge of an "average" performance of a similar set of advertisements on the specific location on a website, or alternatively, of an "average" performance of the advertisement on a similar set of websites. In practice, computing an accurate and unbiased determination of these "average" performance metrics may be difficult to implement.

Therefore, an improved approach is needed to compute a measure of media performance for data sharing applications.

SUMMARY OF THE INVENTION

Consistent with embodiments of the present invention, a method for predicting media performance on a segment of advertising space inventory selects at least one media cell that shares one or more common attributes with a target media cell. The method then estimates a mean revenue per impression for the selected media cell and subsequently predicts a revenue per impression of the target media cell from the estimated mean revenue per impression of the selected media cell.

Consistent with embodiments of the present invention, an apparatus includes a storage device and a processor coupled to the storage device. The storage device stores a program for controlling the processor, and wherein the processor, being operative with the program, is configured to select at least one media cell that shares one or more common attributes with a target media cell. The processor is configured to estimate mean revenue per impression for the selected media cell and then subsequently predict a revenue per impression of the target media cell from the estimated mean revenue per impression of the selected media cell.

Consistent with embodiments of the present invention, a computer readable medium includes comprising a set of instructions that, when executed on a processor, perform a method for estimating media performance on advertising space inventory. The method selects at least one media cell that share one or more common attributes with a target media cell. The method the estimates a mean revenue per impression for the selected media cell and subsequently predicts a revenue per impression of the target media cell from the estimated mean revenue per impression of the selected media cell.

It is to be understood that both the foregoing general description and the following detailed description are exemplary and explanatory only, and are not restrictive of the invention. Further, the accompanying drawings, which are incorporated in and constitute a part of this specification, illustrate embodiments of the invention and together with the description, serve to explain principles of the invention.

DESCRIPTION OF THE EMBODIMENTS

Figure 1:
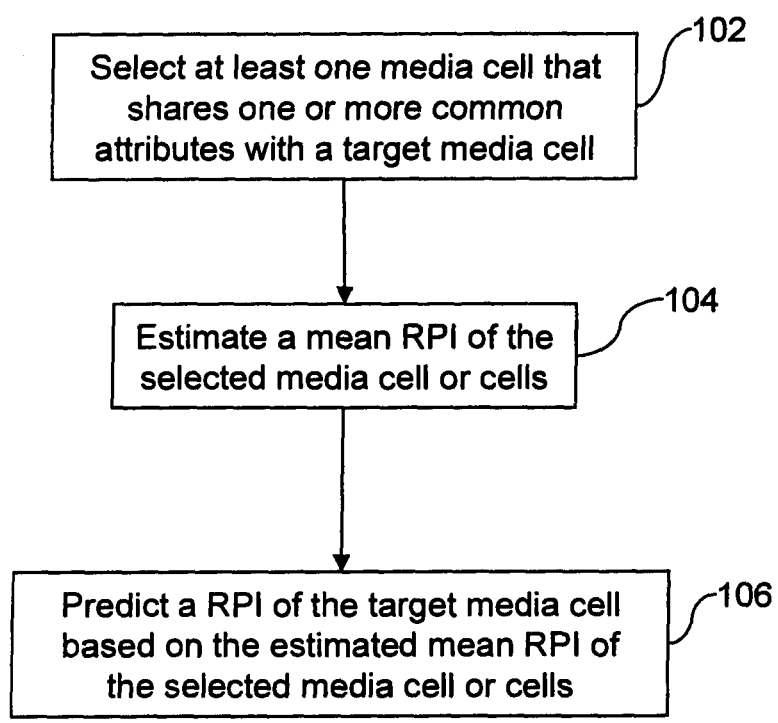
FIG. 1 is a flowchart of an exemplary method for predicting media performance on advertising space inventory, according to an embodiment of the present invention.

Reference will now be made in detail to embodiments of the invention, examples of which are illustrated in the accompanying drawings. The same reference numbers will be used throughout the drawings to refer to the same or like parts.

Notably, as used herein, the terms "media," "advertisement," and "ad" are meant to include any content, including information or messages, as well as Web banners, product offerings, special non-commercial or commercial messages, or any other displays, graphics, video, or audio information.

Further, the term "tract," as used herein, generally refers to a portion of advertising space inventory defined by a plurality of attributes, including, but not limited to, a website, a slot size on that website, and a segmentation model associated with the website and slot size. Moreover, in this application, the term "media cell" or "cell" generally refers to an intersection of a particular media and a particular tract of advertising space inventory.

However, the "media cell" or "cell," as used herein, is not limited to such definitions, and in general, the "media cell" or "cell" may be defined as an intersection of a particular media and any number of abstract properties of advertising space inventory apparent to one skilled in the art. The definitions of other terms used throughout this application, such as "revenue model," "leadback model," "segmentation model," and terms related to these terms are set forth more fully below.

Furthermore, in this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

1. Introduction to Performance Prediction and Data Sharing

Efficient performance prediction requires an accurate initial estimate of a performance of a media on a particular tract of advertising space inventory. Such an initial estimate, if reasonably accurate, helps reduce a number of impressions that a media must be shown in order to obtain a statistically accurate estimate of the performance of the media on the tract of advertising space inventory. The process of determining the optimal number of required impressions is referred to as "learning."

In an embodiment, an exemplary learning strategy schedules a certain minimum number of impressions of a target media on a pre-defined set of inventory to obtain reasonable estimates, or grades, for that media. This strategy, though effective, can be expensive. Alternatively, improvements to the initial performance estimates can be obtained using available historical data related to the target media.

However, in situations where historical data is unavailable for the target media (or campaign), data sharing can provide an initial revenue rate estimate of a specific target media on a particular tract of advertising space inventory, i.e., a target media cell. Data sharing is based on an intuitive idea that reasonable expectations can be derived about how a media will perform on some inventory by considering how that same media has performed on other inventory, or how other medias from the same or similar campaigns have performed on that same inventory.

Different sources of similarity between cells, i.e., different shared characteristics or relationships, can provide various data-sharing opportunities. Example of commonalities or relationships between cells, referred to as "attributes," which provide data sharing opportunities can include, but are not limited to:
(i) a common website;
(ii) a common segmentation model;
(iii) a common slot size;
(iv) a common tract (i.e., a website-slot-segment definition);
(v) a common leadback model;
(vi) a common revenue model;
(vii) a common media or campaign;
(viii) a common run-time definition (RTD) identifier; and
(ix) medias from campaigns having a common industry.

The various relationships that can be used for data sharing purposes can be classified, generally, into three broad categories: segment effects, campaign effects, and attribute effects. Segment effects generally arise when cells share inventory properties, including but not limited to a common website, a common slot size, a common segment model, and a common tract (i.e., a combination of a common website, slot size, and segment model). Campaign effects generally arise when cells share specific media identities, including but not limited to common campaign identifiers and common media identifiers. Attribute effects generally arise when cells share more general media properties, including but not limited to a common leadback model and a common revenue model.

Segment effects correlate the performance of different medias on the same segment of advertising space inventory. For example, predictions of media performance using data from other campaigns on the same website slot are based on segment effects. Intuitively, a likelihood that a visitor to one website will click on or convert a particular media may be greater than that of a visitor to a different website. As such, an average performance of a media on a higher-converting website may be higher than an average performance of that media on a lower-converting website. In general, such correlations are captured by segment effects. Thus, segment effects can contribute to performance predictions for newly-launched campaigns through data sharing.

Attribute effects correlate similarities in performance of different medias having shared attributes or properties. For example, attribute effects account for a portion of a performance estimate that results from specific characteristics of a media, such as a particular revenue model and a particular leadback model. Attribute effects that result from the targeting of a media to particular users, such as the leadback model, may be referred to as "targeting effects." As described above for segment effects, attribute effects can contribute to performance predictions for newly-launched campaigns.

Campaign effects describe the performance of different cells belonging to the same campaign. For example, campaign effects account for that portion of a media's performance estimate attributable to a strength of a campaign. Such effects may arise from a tendency of some campaigns to perform better than other campaigns across a variety of websites. The general term "campaign effect" also encompasses more specific correlations, such as those of a single media or campaign performance segment (CPS) across different websites. In certain embodiments, campaign effects are based on the past performance of medias from a single campaign, so campaign effects cannot contribute to performance predictions for newly-launched campaigns through data sharing.

An underlying premise of data sharing is that similar cells will have similar performance, as measured by revenue per impression (RPI), i.e., revenue earned from events resulting from a number of impressions gathered by a cell divided by the number of impressions. However, such an underlying premise may appear counter-intuitive, especially in view of the wide disparity in media cost-per-unit (CPU) and media conversion rates across an advertising network.

In an embodiment, a "conversion" of a media represents a predefined action that a publisher of the media desires a consumer to complete. For example, a conversion of a particular media on a segment of advertising space inventory can include, but is not limited to, making a purchase from a retailer associated with the media, registering for an email newsletter, and requesting sales information. In such an embodiment, a conversion rate of the media represents a quotient of a number of conversions received by the media during some period and a number of impressions of that media shown during that period.

In general, the conversion rate of a media in a particular campaign is inversely proportional to the cost-per-unit (CPU) of that media in the particular campaign. As such, as an anticipated conversion rate of the media in the campaign decreases, an anticipated CPU of the media in the campaign increases. Campaigns may be priced in this fashion to provide a competitive RPI on an advertising network. Therefore, while large differences exist between the CPUs of media of different campaigns and between the conversion rates of different cells, much less variation exists between the resulting RPIs of these cells.

However, such a generalization does not imply that all media on a particular tract of advertising inventory have identical RPIs. While a wide range of RPIs can exist among different cells, the use of an average RPI of a class of cells as an initial estimate of a RPI of a new cell provides a useful starting point for predicting the performance of that new cell. As such, observations of performance of a group of cells can, in various embodiments, be used to generate performance predictions for cells with no history. Furthermore, data sharing can be used to enhance the performance estimates for such new cells by blending cell-specific history with data from related cells.

Therefore, an exemplary approach to estimate an initial performance of a target cell through data sharing includes:

(i) identifying a set of peer cells similar to the target cell;

(ii) estimating an average RPI of those peer cells; and (iii) using the average as the estimated RPI of the target cell, and the variance of the estimate as the variance.

In such an approach, the set of peer cells may share a common factor or a combination of common factors with the target cell, including but not limited to one or more attribute effects, segment effects, and campaign effects. Furthermore, the target cell itself may be included within the set of peer cells, or alternatively, the target cell may be excluded from the set of peer cells. If the target cell were included within the set of peer cells, historical data associated with the target cell will be considered in the calculation of the estimated average cell RPI. In an embodiment, the target cell may be included within the identified peer cells if the historical data associated with the target cell meets a data sufficiency criteria based on, for example, a quantity or quality of available historical data.

2. Average Cell RPI, Aggregated Cell RPI, and Scheduling Bias

However, care must be taken in estimating an average RPI of a set of peer cells. In some approaches, an aggregated RPI of the peer cells serves as an initial estimate of the average RPI of the peer cells. The aggregated RPI of the impressions awarded to the peer cells can, for example, be calculated by dividing a revenue earned from those cells by the number of impressions awarded to those cells, as follows:

$$RPI_{aggregated} = \frac{\text{Revenue}}{\text{Impressions}} = \frac{\sum a_k c_k}{\sum n_k}, \quad (1)$$

where k is an index of a cell within the peer cells, $a_k$ and $n_k$ are, respectively, the number of events and impressions that have been observed at cell k, and $c_k$ is the cost-per-unit (CPU) of the media from that cell.

The aggregated RPI, as computed above, may serve as an "average" RPI of the set of cells, and hence, may estimate an earning potential of a new, untried cell. However, the aggregated RPI may fail to estimate accurately the average RPI of the peer cells due to a bias introduced during the optimization process.

As previously described, one goal of the optimization process is to determine which medias perform well and which perform poorly, and then to show the high-performing medias more frequently on the segment of advertising space inventory. If the optimization process is successful, then an average revenue earned by the medias shown on some inventory should be higher than a revenue that could be earned by randomly rotating the medias. The following example illustrates the operation of the optimization process and demonstrates how scheduling bias can be introduced into the process.

In one embodiment, for example, an accurate assessment of a performance of a cell can be determined after that cell accumulates 1,000 impressions. Further, in this embodiment, eight competing media are launched on a given tract of advertising space inventory for a test period during which each media is awarded at least 1,000 impressions. At the end of the test period, a revenue per thousand impressions (RPM, i.e., a revenue per impression (RPI) multiplied by 1,000) is calculated for each of the eight media based on the number of impressions received by each media, as described in Table 1. Further, the total revenue earned by each of the media is computed as a product of the RPM for the media and the number of thousands of impressions received by the media. Table 1 lists the revenue-per-thousand-impressions (RPM), total number of impressions, and total revenue earned by each of the eight sample media, consistent with this embodiment.

TABLE 1

| Ad | RPM | Impressions | Revenue |
|---|---|---|---|
| 1 | $0.30 | 1000 | $ 0.30 |
| 2 | $0.50 | 1000 | $ 0.50 |
| 3 | $0.75 | 1000 | $ 0.75 |
| 4 | $0.90 | 2000 | $ 1.80 |
| 5 | $1.00 | 10000 | $ 10.00 |
| 6 | $1.25 | 20000 | $ 25.00 |
| 7 | $1.75 | 100000 | $175.00 |
| 8 | $2.50 | 5000 | $ 12.50 |
|  | Avg = $1.12 | Σ = 140000 | Σ = $225.85 |

In the embodiment of Table 1, Ads 1, 2, and 3, which respectively have the lowest RPM among the eight media, would not receive impressions outside of the testing period. Further, Ad 8 appears to be performing strongly with a RPM of $2.50. However, with only 5,000 impressions, Ad 8 appears to be targeted to a relatively small audience (i.e., Ad 8 is tightly-targeted) and as such, would be ineligible for most impressions on the sample tract. Ad 7, with $1.75 RPM and 100,000 impressions, is both a strong performer and broadly targeted, and as such, would receive the most impressions through the optimization process.

The average RPM of these individual media on the tract (e.g., an arithmetic mean RPM of the cells) is $1.12, and using data sharing, this average RPM could be an accurate prediction for the RPM of a new, unknown media on this tract. In contrast, an aggregated RPM of this tract is calculated by dividing the total revenue earned by the impressions served:

$$RPM_{aggregated} = \frac{Revenue}{Impressions} \times 1000 \quad (2)$$
$$= \frac{\$225.85}{140000} \times 1000$$
$$= \$1.61$$

The aggregated RPM of $1.61 is higher than the average RPM of the individual cells. Such a result is both expected and desired in this embodiment, as the optimization process successfully identified and preferentially displayed the higher-performing medias of the tract. Therefore, in this embodiment, the effective operation of the optimization process results in a discrepancy between aggregated and average RPM.

In an additional embodiment, a discrepancy between aggregated and average RPM can result from the fact that campaigns have predetermined budgets. For example, a campaign with a large budget may have a greater chance of receiving impressions than a comparable campaign with a smaller budget. As such, the campaign with the large budget may have a larger contribution to aggregated RPM than the comparable campaign with the smaller budget. In such a fashion, predetermined budgets for different campaigns may bias, either positively or negatively, performance of a website on which these campaigns are shown. Such discrepancies between aggregated and average RPM may be referred to as "scheduling bias."

Data sharing predictions that use aggregated RPI (or RPM) as an estimate for average cell RPI may be too optimistic, thus resulting in new cells being overvalued relative to established cells, e.g., existing cells that have gathered a substantial number of impressions and/or actions. If this leads to newer cells winning inventory that ideally should have gone to established cells, the result is lower overall revenue for the advertising network.

In practice, the calculation of a more precise RPI of performance-based cells and an average cell RPI may be difficult to perform. However, in such situations, the aggregated cell RPI may be relatively straightforward to calculate. Therefore, even in view of its inherent scheduling bias, the aggregated cell RPI may be used to estimate an average cell RPI in data sharing approaches.

3. Methods and Systems for Estimating Media Performance Using Distribution Modeling FIG. 1 illustrates an exemplary method 100 for estimating media performance on advertising space inventory that probabilistically models average cell RPI with limited scheduling bias, according to an embodiment of the invention. In step 102, at least one media cell is selected that shares one or more common attributes with a target media cell, thereby forming a set of selected media cells. These common attributes can include, but are not limited to: a common tract of advertising space inventory, a common revenue model, a common slot size, a common segmentation model, a common media, a common industry campaign, or any additional or alternate attribute apparent to one of skill in the art.

In an embodiment, the set of selected media cells can include a single media cell that shares one or more common attributes with the target media cell. However, in an additional embodiment, step 102 can select any plurality of media cells that share one to more common attributes with the target media cell without departing from the spirit or scope of the present invention.

In an embodiment, the target media cell represents a media, including, but not limited to, an advertisement displayed on a target tract of advertising space inventory. Furthermore, each of the selected media cells represents a media, including, but not limited to, an advertisement displayed on a selected tract of advertising inventory. However, the target and selected cells are not limited to such representations, and in additional or alternate embodiments, the target media cell and each selected media cell can respectively represent an intersection of a particular media with any additional or alternate property of advertising space inventory.

Step 104 estimates a mean revenue per impression (RPI) of the set of selected media cells. In an embodiment, step 104 estimates the mean RPI of the selected media cells using a mathematical model of an underlying continuous probability distribution for the RPI of the selected media cells, as described below in reference to FIG. 3. As such, the calculation of the estimated mean RPI of the set of selected media cells in step 104 may reduce or eliminate the scheduling bias that may be associated with estimates of mean RPI, such as an aggregate cell RPI.

Furthermore, in an embodiment, step 104 can adjust the estimated mean RPI of the set of selected media cells to account for a leadback model associated with the target media cell. For example, step 104 can adjust the estimated mean RPI of the set of selected media cells to account for an audience leadback model or an advertiser leadback model of the target media cell.

Step 106 predicts a revenue per impression (RPI) of the target media cell based on the estimated mean RPI of the set of selected media cells. In an embodiment, step 106 first defines an initial estimate of the RPI of the target media cell based on the estimated mean RPI of the set of selected media cells. Step 106 then predicts the RPI for the target media cell based on at least the initial estimate. In an embodiment, step 106 computes the RPI of the target media cell by blending the initial estimate of the RPI of the target media cell with data on historical performance of the target media cell.

In an embodiment, the selected media cells and the target media cell share both a common tract of advertising space inventory and a common revenue model. In this embodiment, the RPI of the target media cell predicted by step 106 corresponds to a specific tract of advertising space and a specific revenue model. However, in an additional embodiment, a target media cell may be associated with multiple revenue models. As such, the processes described above in reference to FIG. 1 can predict multiple RPIs for a target media cell, wherein each predicted RPI corresponds to a different revenue model.

Further, in additional embodiments, a particular media having a particular revenue model may be associated with a parcel of advertising space inventory that includes multiple individual tracts. In such embodiments, the particular media may be associated with multiple target media cells that collectively form the parcel of advertising space inventory. As such, the processes of FIG. 1 can predict a tract-level RPI for each of the multiple target media cells associated with the particular media and revenue model, and as described below in reference to FIG. 6, combine these multiple tract-level RPI predictions into a parcel-level prediction for the RPI of the media and revenue model.

Figure 2:
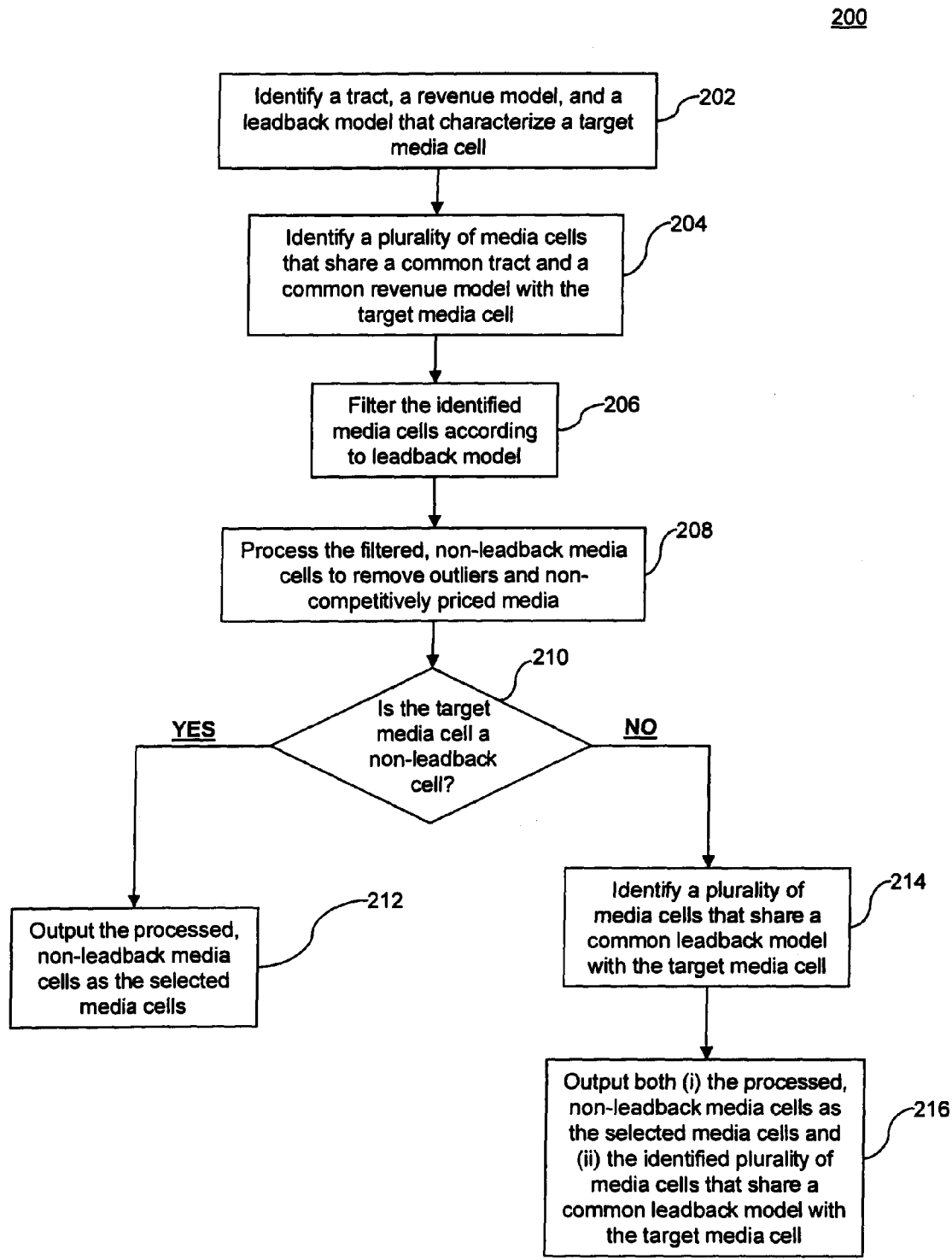
FIG. 2 is a flowchart of an exemplary method for selecting media cells that share one or more common attributes with a target media cell, according to an embodiment of the present invention.

FIG. 2 illustrates an exemplary method 200 for selecting media cells, according to an embodiment of the present invention. For example, method 200 may be incorporated into step 102 of FIG. 1 to select media cells that share one or more common attributes with a target media cell.

Step 202 identifies a tract, a revenue model, and a leadback model that characterize a target media cell, such as the target media cell described above with reference to step 102 of FIG. 1. In an embodiment, the tract of the target media cell may include a website associated with the target media cell, a slot size of the target media cell, and/or a segmentation model associated with the target media cell. In such an embodiment, the tract can define a "website-slot-segment" associated with the target media cell.

Further, in an embodiment, the segmentation model can include, but is not limited to, frequency segmentation, a segmentation that defines cookied and cookieless segments, and a geographic segmentation (e.g., one that includes separate segments for the US, Canada, UK, and the rest of world). In a further embodiment, any additional or alternate segmentation model can characterize the target media cell without departing from the spirit or scope of the present invention.

Further, in an embodiment, the identified revenue model may include a click-to-conversion (C2C) model, an impression-to-conversion (I2C) model, and/or a cost-per-click (CPC) model. For example, the C2C model refers to a campaign in which a user must click on a media served by an advertising network and then complete some action before the advertising network receives payment from a publisher of the media. In contrast, the I2C model refers to a campaign in which the advertising network receives payment when the user completes an action after seeing an impression of the media served by the advertising network, regardless of whether or not that user clicked on the media. Further, the CPC model refers to a campaign in which the media server receives payment from a publisher of a media when the end user clicks on the media. In further embodiments, any additional or alternate revenue model can characterize the target media cell without departing from the spirit or scope of the present invention.

Further, in an embodiment, the target media cell may be a non-leadback cell, or alternatively, the target media cell may be associated with an audience leadback model or an advertiser leadback model. For example, the audience leadback model refers to a type of targeting that shows a media to individuals who have previously visited some website of interest to a publisher of the media, other than the publisher's own website. Further, for example, the advertiser leadback model refers to a type of targeting that shows a media to individuals who have previously visited the publisher's website. However, the target media cell is not limited to such leadback models, and in further embodiments, any additional or alternative leadback model can characterize the target media cell without departing from the spirit or scope of the present invention.

Once step 202 identifies the attributes of the target media cell, step 204 identifies one or more media cells, which may or may not include the target media cell, and which share a common revenue model and a common tract definition with the target media cell. Step 206 filters the identified media cells to separate non-leadback media cells from each variety of leadback media cells (e.g., advertiser-leadback media cells and audience-leadback media cells).

Step 208 then processes the filtered non-leadback media cells to remove outliers from the filtered set of media cells. Outliers may be media cells whose estimated performance is either too high, or alternatively, too low, to be included in the RPI distribution modeling.

In an embodiment, step 208 removes outliers by first defining a minimum threshold revenue per thousand impressions (RPM), $RPM_{MIN}$, and a maximum threshold RPM, $RPM_{MAX}$, for each tract and potentially, for each revenue model, identified in step 202. Thresholds $RPM_{MIN}$ and $RPM_{MAX}$ are tunable parameters that, for example, can be set respectively to $0.001 and $50 for media cells having I2C and C2C revenue models.

Step 208 then removes a media cell from the set of filtered media cells based on a threshold certainty that the RPI of the media cell falls outside of the range [$RPM_{MIN}$, $RPM_{MAX}$]. For example, step 208 can remove outliers based on a threshold certainty of 90%, i.e., a 90% or greater certainty that the RPI of the media cell falls outside of the range [$RPM_{MIN}$, $RPM_{MAX}$]. However, in additional embodiments, step 208 can remove outlier cells based on any alternate threshold certainty appropriate to the filtered media cells without departing from the spirit or scope of the invention.

To illustrate the removal of outlier cells in this embodiment, a media may have a cost-per-unit (CPU) of $1 and may have received 100,000 impressions on a certain tract without receiving an action. While an observed RPI for the media cell is zero, that cell is not classified as an outlier. Since the cell has received relatively few impressions, only a small certainty exists that the RPM of the media cell is less than $0.001. In such an example, the media cell would have to be awarded approximately 2.2 million impressions without receiving a single action before sufficient certainty (e.g., a 90% certainty) exists that the RPM is less than $0.001.

Further, step 208 also processes the filtered non-leadback media cells to remove those cells that are priced in a non-competitive fashion. In an embodiment, media of a particular cell may be associated with a campaign that is priced below a market price of similar campaigns. For example, an advertising network may offer media, for example, "house media," to its parent corporation at a discount to a prevailing market price. Such non-competitively priced media may be characterized by low performance and as such, may not be suitable for RPI distribution modeling. In an embodiment, non-competitively priced media can be identified in step 202 and can be removed in step 208 based on this identification.

Once the filtered media cells have been processed in step 208 to remove outliers and/or house media, step 210 determines whether the target media cell is associated with a particular leadback model. If step 210 determines that the target media cell is a non-leadback media cell, then the processed media cells are output in step 212, after which the mean RPI of the processed cells may be estimated in step 104 of FIG. 1.

However, if step 210 determines that the target cell is associated with a particular leadback model, e.g., an audience leadback model or an advertiser leadback model, then step 214 identifies media cells that share a common leadback model, a common revenue model, and/or a common tract definition with the target media cell. In an embodiment, step 214 can also process these identified cells to remove both house ads and outliers. Step 216 outputs the processed non-leadback media cells, as generated in step 208, and the identified set of leadback media cells, as identified in step 214, after which the mean RPI of the processed non-leadback cells may be estimated in step 104 of FIG. 1 and subsequently adjusted for the identified leadback model.

Figure 3:
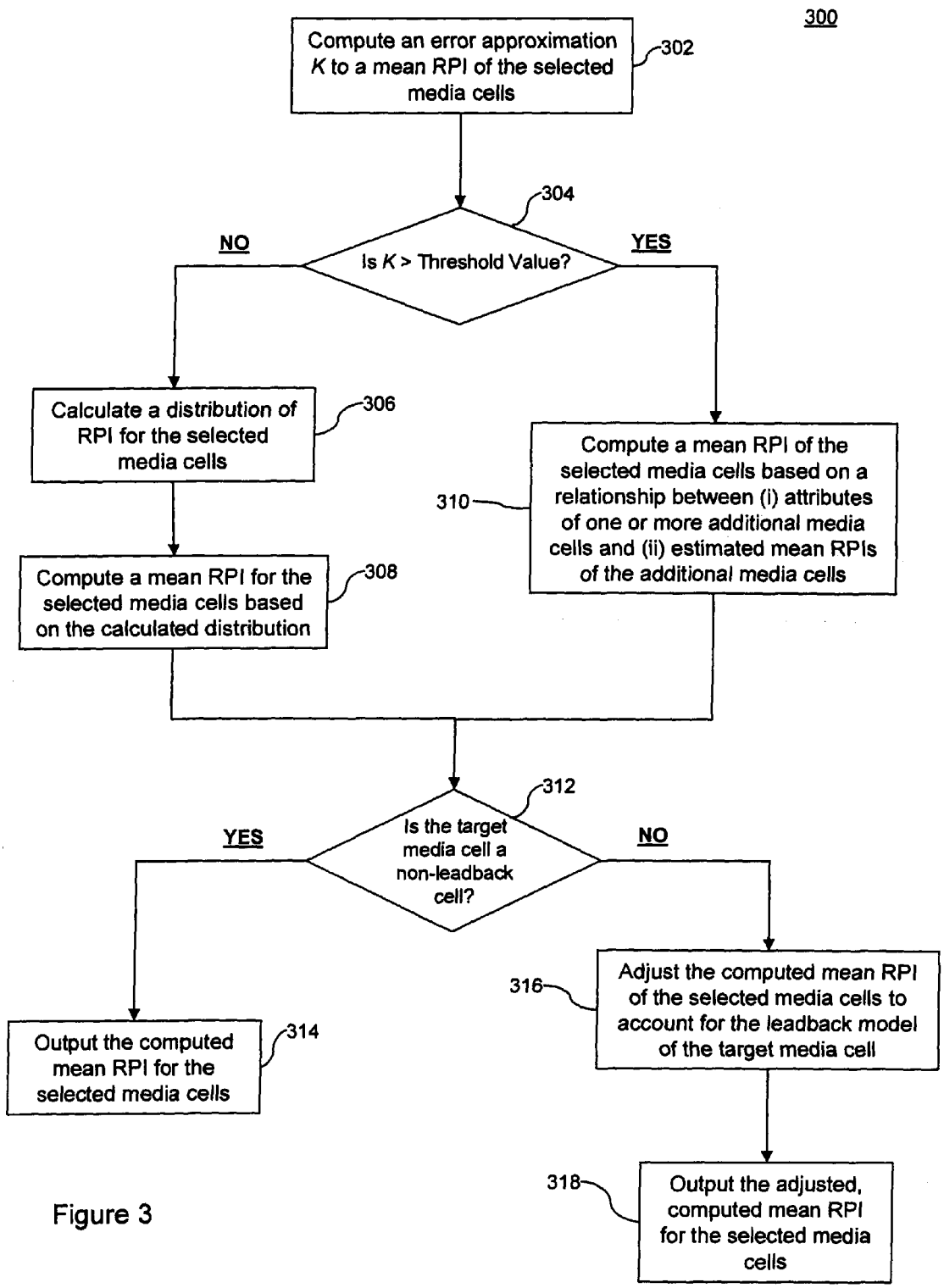
FIG. 3 is a flowchart of an exemplary method for estimating a mean revenue per impression (RPI) of media cells using RPI distribution modeling, according to an embodiment of the present invention.

FIG. 3 illustrates a method 300 for estimating a mean revenue per impression (RPI) for a set of media cells using RPI distribution modeling, according to an embodiment of the present invention. For example, method 300 can be incorporated into step 104 of FIG. 1 to estimate the mean RPI of the selected media cells.

Step 302 computes an error approximation for a mean RPI of a set of selected media cells, such as those identified by the exemplary method of FIG. 2. In an embodiment, the computed error approximation determines whether, for the selected media cells, sufficient data exists to proceed with RPI distribution modeling. A mean cell RPI estimate may be most reliable when it is based on a large number of impressions from a variety of medias. Increasing both the number of medias used in the calculation and the number of impressions each media has received may lead to a better estimate of the mean RPI for the selected cells.

In an embodiment, the error approximation K computed in step 302 represents a ratio of a standard error of an estimate of mean cell RPI to an average cell RPI, as follows:

$$K = \frac{\text{standard error of } RPI}{RPI} \approx \frac{1}{\sqrt{\sum_i \frac{n_i}{n_i + c_i/\mu_N}}}, \quad (3)$$

where $n_i$ and $c_i$ represent, respectively, a number of impressions and a cost per unit for each media i in the set of selected media cells, $\mu_N$ is a tunable parameter that represents the network average RPI, and K ranges from zero to one. In various embodiments, $\mu_N$ depends on a particular revenue model of the selected media cells and a geographic segmentation of the selected media cells, as the value of $\mu_N$ is currency-dependent.

Step 304 compares the error approximation computed in step 302 to a threshold parameter $K_T$ to determine whether sufficient data exists to proceed with RPI distribution modeling. In an embodiment, data on the selected set of media cells can include, but is not limited to, information on a number of impressions gathered by the selected media cells and a corresponding number of actions received by the selected media cells.

For example, step 304 can determine whether $K > K_T$. In an embodiment, a specific value of $K_T$ may reflect, for example, an estimate of a quality of the data on the selected set of media cells. Further, in an embodiment, the specific value of $K_T$ can range from zero (indicating little confidence in the quality of the data) to one (indicating substantial confidence in the quality of the data).

In an embodiment, the threshold parameter $K_T$ can be fixed at a particular value for any revenue model or geographic segmentation of a selected set of media cells. However, in additional embodiments, the threshold parameter $K_T$ can be a tunable parameter that is variable in response to varying geographic segmentations, revenue models, or other attributes. For example, a set of media cells on a given tract could be assigned a first threshold parameter for a first revenue model, while the same set of media cells having a different revenue model can be assigned a different threshold value.

If step 304 determines that the error approximation K is less than the threshold parameter, $K_T$, then sufficient information on the selected media cells exists to estimate the mean RPI of the selected media cells using RPI distribution modeling. In such an instance, step 306 calculates a distribution of RPI for the selected media cells. In an embodiment, the calculation of the distribution of RPI for the selected media cells in step 306 includes at least: (i) a functional form of the probability distribution of the RPI of the selected media cells; and (ii) a probability relationship between an RPI of a media within the selected media cells and a number of events that result from some given number of impressions.

For example, in certain embodiments, step 306 models a probability that a media has an RPI of r using a Gamma distribution family parameterized by $(t, \lambda)$, as follows:

$$f(r) = \frac{\lambda e^{-\lambda r}(\lambda r)^{t-1}}{\Gamma(t)}. \quad (4)$$

The Gamma distribution of Equation 4 describes a family of distribution curves, where each distribution curve corresponds to a particular tract of advertising space inventory. In Equation 4, $\lambda$ represents a "scaling factor" that describes a "stretching" of each distribution curve, and t represents a "shaping factor" that determines an existence or sharpness of a peak of each distribution curve.

Figure 4:
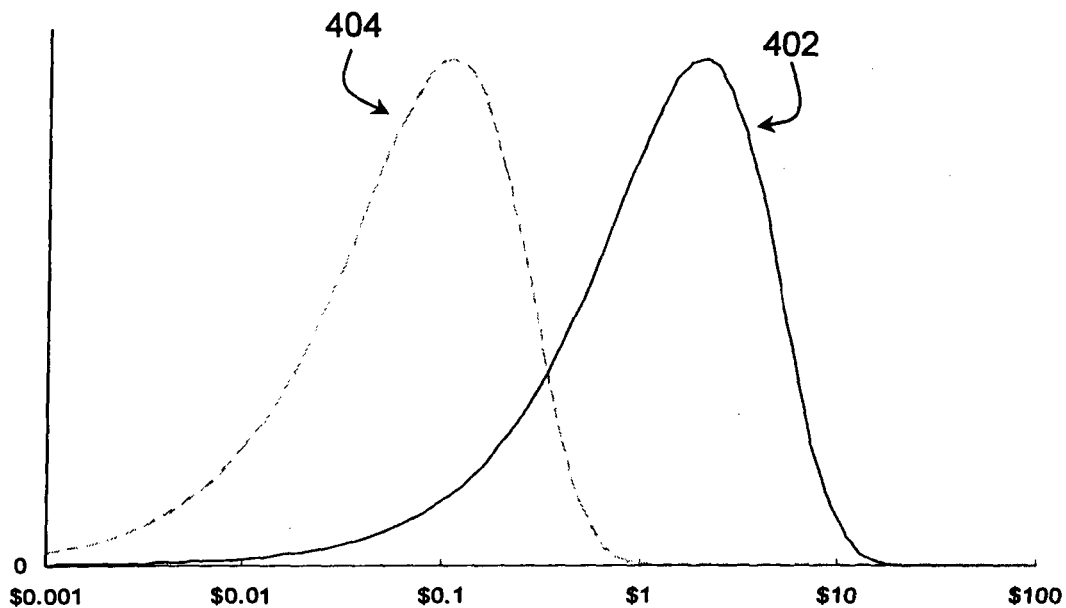
FIG. 4 is a graph of an exemplary RPI distribution for a media cell, according to an embodiment of the present invention.

FIG. 4 is a logarithmic plot of the exemplary Gamma distribution of Equation (4) for two different tracts of advertising space inventory. One tract, depicted by distribution curve 402, has an estimated mean RPM of $1.60, while the second tract, depicted by distribution curve 404, has an estimated mean RPM of 8.50. In FIG. 4, the respective mean RPMs of distribution curves 402 and 404 roughly correspond to the location of the peaks of the respective curves. In the log domain, $\lambda$ affects a location of the peak along the x-axis, while t affects a sharpness of the peak relative to its width.

Referring back to FIG. 3, step 306 may determine that a conditioned probability for a media i with RPI n to receive $a_1$ events if it has received $n_i$ impressions is:

$$Prob((n_i, a_i) \mid r_i) = \binom{n_i}{a_i}\left(\frac{r_i}{c_i}\right)^{a_i}\left(1 - \frac{r_i}{c_i}\right)^{n_i - a_i} \quad (5)$$

$$\approx \binom{n_i}{a_i}\left(\frac{r_i}{c_i}\right)^{a_i} e^{-\frac{r_i}{c_i}(n_i - a_i)}.$$

The approximation of Equation 5 is based on an assumption that a conversion or click is a rare event, e.g., that a probability of getting clicks or conversions is less than about 5%. However, the calculation in step 306 is not limited to such conditioned probabilities, and in an alternate embodiment, the calculations of step 306 may use any alternate probability relationship without departing from the spirit or scope of the present invention.

Based on the probability distribution of Equation 4 and the conditioned probability of Equation 5, step 306 calculates the distribution of revenue per impression for the set of selected media cells. In such an embodiment, inputs to the calculation of step 306 may include: (i) a set of costs-per-unit (CPUs) $c_i$ for the selected media cells and (ii) a number of impressions $n_i$ and number of events $a_i$ for the set of selected media cells.

Once the distribution has been calculated, step 306 uses a maximum likelihood approach to determine parameters $\lambda$ and t from the computed probability distribution, as follows:

$$L(t, \lambda) = \sum_i \int_0^\infty prob((n_i, a_i) \mid r_i) f(r_i) dr_i \quad (6)$$

$$= \sum_i \int_0^\infty \binom{n_i}{a_i}\left(\frac{r_i}{c_i}\right)^{a_i} e^{-\frac{n}{c_i}(n_i - a_i)} \frac{\lambda e^{-\lambda r_i}(\lambda r_i)^{t-1}}{\Gamma(t)} dr_i,$$

where $L(t,\lambda)$ is a likelihood function. Using the Gamma integral formula, a likelihood function $L(t,\lambda)$ takes the following form:

$$L(t, \lambda) = \sum_i \frac{\Gamma(a_i + t)\lambda^t}{\Gamma(t)\left(\lambda + \frac{n_i a_i}{c_i}\right)^{a_i + t}}. \quad (7)$$

The likelihood function of Equation (7) can then be maximized using existing optimization tools to find an optimal t and $\lambda$.

Step 308 then computes a mean RPI for the set of selected media cells based on the probability distribution computed in step 306. In an embodiment, the mean of the distribution, which is the estimated mean RPI of the selected media cells, then takes the following form:

$$\mu = \frac{t}{\lambda}. \quad (8)$$

Furthermore, the variance of the estimated mean RPI for the selected set of media cells becomes:

$$\mathrm{var}(\mu) = \sigma_\mu^2 = \frac{t}{\lambda^2}. \quad (9)$$

Referring back to step 304, if the error approximation computed in step 302 exceeds the threshold value (i.e., $K > K_T$), then the selected media cells have gathered an insufficient number of impressions and corresponding actions to accurately model the estimated mean RPI for the selected cells using RPI distribution modeling. In such an instance, step 310 computes a mean RPI for the selected media cells based on a relationship between attributes of one or more additional media cells (or sets of media cells) and estimated RPIs of the one or more additional media cells (or sets of media cells), which have been computed, respectively, from RPI distribution modeling.

In an embodiment, step 310 generates a model that predicts the estimated mean RPI for each of the additional media cells (or sets of cells) based on one or more attributes of the additional media cells (or sets of cells), including, but not limited to, tract attributes such as website, slot size, and audience segmentation. The generated model then predicts a mean RPI for the selected media cells based on a correlation between one or more attributes of the selected media cells and corresponding attributes of the additional media cells (or sets of cells).

Once the mean RPI for the selected media cells has been computed, e.g., through step 308 or step 310, step 312 tests whether the target media cell is a non-leadback media cell. If the target media cell is a non-leadback media cell, step 314 outputs the computed mean RPI for the selected media cells, after which the RPI for the target media cell may be predicted by step 106 of FIG. 1.

However, if step 312 determines that the target media cell is a leadback cell, then step 316 adjusts the computed mean RPI for the selected media cells to account for the leadback model of the target cell.

Leadback medias are medias that are targeted at individuals with specific web-browsing history. In certain embodiments, leadback medias may exhibit higher RPIs than non-leadback medias. Such behavior is an example of an attribute effect, as described above. Leadback may include, for example, audience leadback and advertiser leadback.

Audience leadback targets individuals who have visited certain content sites in an advertising network. For example, medias advertising a new vehicle may be targeted at individuals who have visited automobile review sites. Advertiser leadback targets individuals who have previously visited the advertiser's specific site. For example, customers who have previously shopped at an on-line retailer may be shown ads or offered special coupons from that same retailer. In certain embodiments, leadback models use cookies stored on a consumer's computer to recognize that the consumer has previously visited the website and thus meets the targeting criteria.

In an embodiment, step 316 models the effect of the leadback model, such as advertiser leadback or audience leadback, by applying a multiplicative factor to the mean RPI of the selected media cells of tract j, $\mu_j$. For example, historical data can be used to derive statistical properties of a factor h, which relates a mean RPI of a leadback media to a mean RPI of a corresponding non-leadback media. In particular, a mean of factor h (denoted by $\bar{h}$) can be derived and can then be used to scale the mean RPI of the selected media cells, $\mu_j$, to obtain an initial estimate for leadback media on segment j.

In an embodiment, step 316 estimates mean of factor h, $\bar{h}$, by first assuming a functional form for a distribution of h. For example, step 316 can model h using a Gamma distribution family parameterized by $(t, \lambda)$, as follows:

$$f(h) = \frac{\lambda e^{-\lambda h}(\lambda h)^{t-1}}{\Gamma(t)}. \quad (10)$$

As described above in reference to the assumed distribution for RPI in step 316, $\lambda$ is a scaling factor that describes a stretching of a distribution curve, and t is a shaping factor that determines an existence or sharpness of a peak of a distribution curve.

Conditional on h, a probability of observing $n_{ij}$ impressions and $a_{ij}$ actions for media i with cost per unit (CPU) $c_i$ on tract j with tract mean RPI $\mu_j$ is modeled as:

$$Prob((n_{ij}, a_{ij}) \mid h) = \frac{h\mu_j e^{-h\mu_j n_{ij}/c_i}(h\mu_j n_{ij}/c_i)^{a_{ij}/c_i - 1}}{c_i \Gamma(a_{ij}/c_i)}. \quad (11)$$

As such, the overall likelihood L of observing $(n_{ij}, a_{ij})$ is:

$$L(t, \lambda) = \int_0^\infty Prob((n_{ij}, a_{ij}) \mid h) f(h) dh \quad (12)$$

$$= \frac{\Gamma(a_{ij}/c_i + t)(n_{ij}/c_i)^{a_{ij}/c_i - 1} \lambda^t \mu_j^{a_{ij}/c_i}}{c_i \Gamma(a_{ij}/c_i)\Gamma(t)(\lambda + \mu_j n_{ij}/c_i)^{a_{ij}/c_i + t}}.$$

The above-described likelihood is valid for a media cell or set of media cells that have gathered at least one action, i.e., $a_{ij} \ne 0$. For a media cell or set of media cells that have no observed actions, i.e., $a_{ij} = 0$, step 316 considers a probability of no payouts in $n_{ij}$ impressions given the payout rate $h\mu_j$. This event can alternatively be described as the probability that the first conversion occurs later than $n_{ij}$:

$$Prob(n_{ij}, 0) = e^{\frac{r_{ij} n_{ij}}{c_i}}. \qquad (13)$$

Under this assumption:

$$L(t, \lambda) = \int_0^\infty Prob((n_{ij}, a_{ij}) \mid h) f(h) dh \qquad (14)$$
$$= \frac{\lambda^t}{(\lambda + \mu_j n_{ij}/c_i)^t}.$$

Step 316 then estimates parameters $\lambda$ and t by maximizing the likelihood function over all observations, i.e., through a maximum likelihood approach. Using t and $\lambda$, step 316 then computes $$\bar{h} = \frac{t}{\lambda},$$

and an initial RPI estimate for a narrowly targeted media on tract j is then:

$$\mu_j^T = \bar{h} \mu_j. \qquad (15)$$

If $\mu_j^T$ serves as the estimated mean RPI for selected media cells, then the variance of estimation error will be the variance of the estimated Gamma distribution, as follows:

$$\sigma_{\mu T}^2 = \frac{t}{\lambda^2} \mu_j^2. \qquad (16)$$

As such, in the presence of a leadback model associated with the target cell, step 316 computes a product of the estimated mean RPI for the selected non-leadback media cells and the multiplicative factor $\bar{h}$. Once adjusted in step 316, the estimated, adjusted mean RPI for the selected media cells is output by step 318, after which step 106 of FIG. 1 may predict the mean RPI for the target media cell.

Figure 5:
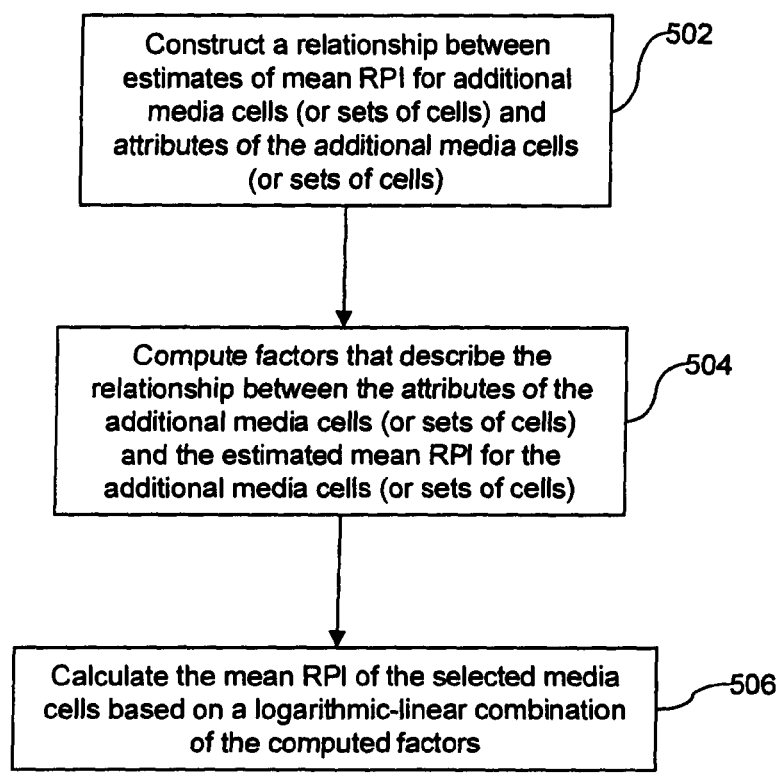
FIG. 5 is a flowchart of an exemplary method for computing mean RPI for media cells having insufficient data for RPI distribution modeling, according to an embodiment of the present invention.

FIG. 5 depicts a process 500 for computing a mean RPI for a set of media cells having insufficient impression data for RPI distribution modeling, according to an embodiment of the present invention. For example, process 500 may be incorporated into step 310 of FIG. 3 to compute the mean RPI for the selected media cells when $K > K_T$.

Step 502 constructs a relationship between estimates of mean RPIs for additional media cells or sets of media cells, which have been computed from probabilistic distributions of RPI (e.g., in step 306 and 308 of FIG. 3) and attributes of the various media cells or sets of media cells. The attributes can include but are not limited to tract attributes, such as website, slot size, and behavior segment group. However, the processes described herein are not limited to tract attributes, and in additional embodiments, step 502 can construct a relationship between a mean RPI of a media cell or set of media cells and any additional or alternate attribute without departing from the spirit or scope of the present invention.

TABLE 2

| Website | Slot Size | User Segment Group | RPI |
|---|---|---|---|
| AOL | 1 | .EDU | $1e-4 |
| AOL | 2 | .COM | $5e-4 |
| AOL | 1 | .COM | $3e-4 |
| Yahoo! | 1 | .COM | $4e-4 |
| . | . | . | . |
| . | . | . | . |
| . | . | . | . |

Table 2 illustrates exemplary estimates of mean RPI and corresponding values of tract attributes for several exemplary media cells (or sets of media cells). In this embodiment, $w_i^k$ denotes the factor corresponding to value i of attribute k. For example, using website as the first attribute (i.e., k=1), slot size as the second attribute (i.e., k=2), and user segment group as the third attribute (i.e., k=3), Tables 3A-3C list an exemplary factor attribute correspondence:

TABLE 3A

| AOL | Yahoo! | AOL-Mail | CNN | ... |
|---|---|---|---|---|
| $w_1^1$ | $w_2^1$ | $w_3^1$ | $w_4^1$ | ... |

TABLE 3B

| Slot 1 | Slot 2 | Slot 3 | Slot 4 | ... |
|---|---|---|---|---|
| $w_1^2$ | $w_2^2$ | $w_3^2$ | $w_4^2$ | ... |

TABLE 3C

| .Edu | .Com | .Net 3 | ... |
|---|---|---|---|
| $w_1^3$ | $w_2^3$ | $w_3^3$ | ... |

In this embodiment, $b_j^k$ denotes the index of the $k^{th}$ attribute of segment j. For example, if segment 8, i.e. j=8, is "CNN, Slot2,.Edu" from Table 2, then $b_8^1=4$, $b_8^2=2$, $b_8^3=1$.

In this embodiment, step 502 assumes a logarithmic-linear relationship between the factors ($w_i^k$) associated with a particular media cell j (or set of media cells j) and the corresponding mean RPI ($\mu_j$) for the media cell (or set of media cells). In particular, for the three attributes described above, step 502 assumes:

$$\log(\mu_j) = w_{b_j}^1 + w_{b_j}^2 + w_{b_j}^3, \qquad (17)$$

or, in general for any number of attributes:

$$\log(\mu_j) = \sum_k w_{b_j^k}^k. \qquad (18)$$

The above-described model can be alternatively explained using the following notations. Using a matrix for the $k^{th}$ attribute, defined as $D^k = \{d_{ij}^k\}$, $$d_{ij}^k = \begin{cases} 0 & \text{if } i \neq b_j^k; \\ 1 & \text{if } i = b_j^k. \end{cases} \qquad (19)$$

Step 504 may set $W^k = [w_1^k \, w_1^k \, w_{l_k}^k]$, where $l_k$ is the number of distinct values for the $k^{th}$ attribute. Now, if $D := [D^1 \, D^2 \ldots]$, $W:=[W^1 \ W^2 \ldots]$, and $\eta=[\log(\Phi_1) \log(\Phi_2) \ldots]$, the regression can be expressed by step 502 as:

$$\eta = DW. \quad (20)$$

In an embodiment, step 504 can solve the regression of Equation (20) for W using a least squares (LS) approach, thereby obtaining the set of factors $w_i^k$ that describe the relationship between the attributes of media cell j (or set of media cells)) and the mean RPI of media cell j (or set of media cells).

Once step 504 determines factors for the additional media cells or set of media cells having probabilistically-computed estimates of mean RPI, step 506 then estimates the mean RPI for the selected media cells based on a correlation between attributes of the selected media cells and the computed factors $w_i^k$.

When estimating the mean RPI for the selected media cells, such as those identified in FIG. 2, step 506 may determine, for example, that:

(i) all factors $w_i^k$ that describe the attributes of the selected media cells are available without aliasing;
(ii) all factors $w_i^k$ that describe the attributes of the selected media cells are available, but aliasing exists; or
(iii) some factors $w_i^k$ that describe the attributes of the selected media cells are not available.

In scenario (i), step 504 has computed factors corresponding to three attributes (e.g., website, slot size, and segmentation model) that describe the selected media cells. As such, step 506 can estimate the mean revenue per impression for the selected media cells, $\mu_{cells}$, as:

$$\log(\mu_{cells}) = w_{b_{cells}^1}^1 + w_{b_{cells}^2}^2 + w_{b_{cells}^3}^3, \quad (21)$$

or, for any arbitrary number of attributes K, as:

$$\log(\mu_{cells}) = \sum_{k=1}^{K} w_{b_{cells}^k}^k. \quad (22)$$

In the above equations, $b_{cells}^k$, denotes the index of the $k^{th}$ attribute of the selected media cells, and $w_{b_{cells}^k}^k$ denotes the factor computed in step 502 that corresponds to index $b_{cells}^k$.

The variance of the estimate of the mean RPI computed by step 506 can be expressed as:

$$var(\mu_{cells}) = \sigma_\mu^2 = \beta \mu^2, \quad (23)$$

where $\beta$ is a tunable parameter and empirically chosen to provide a best fit to the data. In an embodiment, the chosen value $\beta$ lies in a range from one to five. However, in additional embodiments, the value of $\beta$ may fall above or below this exemplary range without departing from the spirit or scope of the present invention. Further, in an additional embodiment, $\beta$ can be initially set to unity and periodically reviewed and adjusted, for example, in an effort to achieve better fit as the selected media cells gather more impressions and actions.

However, in situation (iii), one or more factors may not exist or may not be combined using Equations 21 and 22. For example, in a set of selected media cells characterized by website A, slot B, and a user segment group C, if a factor corresponding to website A is not available, step 506 can replace this unknown factor by an average factor derived from all other available website factors associated with slot B and user segment group C. Once this average factor is derived, the mean revenue per impression for the selected media cells can be estimated as in scenario (i). The following example, summarized in Table 4, illustrates the operation of steps 502, 504, and 506 in view of scenarios (i) and (iii) described above.

In this exemplary embodiment, nine non-leadback media cells (or alternatively, sets of media cells) of a specific revenue model have been characterized in terms of three tract attributes: a website, a slot, and a segmentation model. In the example of Table 4, a mean revenue per thousand impressions (RPM) may have been estimated for cells 1-7 (or sets of media cells 1-7) using RPI distribution modeling, e.g., as described above in reference to steps 306 and 308 of FIG. 3.

TABLE 4

| Row # | Website | Slot | Segmentation | $\mu \times 1000$ |
|---|---|---|---|---|
| 1 | CoolPortal | 10 | Frequency 1 | $1.30 |
| 2 | CoolPortal | 10 | Frequency 5-9 | $0.20 |
| 3 | CoolPortal | 21 | Frequency 1 | $1.75 |
| 4 | CoolPortal | 21 | Frequency 5-9 | $0.25 |
| 5 | Mybook | 10 | Frequency 1 | $0.40 |
| 6 | Mybook | 10 | Frequency 5-9 | $0.05 |
| 7 | Mybook | 21 | Frequency 1 | $0.60 |
| 8 | Mybook | 21 | Frequency 5-9 | ? |
| 9 | BittyBlog | 21 | Frequency 1 | ? |

Rows 8 and 9 of Table 4 describe respective media cells (or respective sets of media cells) that lack sufficient impression data to compute a mean RPI using RPI distribution modeling. As such, the mean revenue per impression for these cells or sets of cells is unknown. The following example illustrates the estimation of these mean RPIs, i.e., $\mu_8$ and $\mu_9$, using the processes of FIG. 5.

As described above in reference to step 502, the mean RPI for each of the media cells or sets of media cells in Rows 1-7 of Table 4 can determined from factors $w_{website}$, $w_{slot}$, and $w_{segmentation}$ as follows:

$$\log(\mu) = w_{website} + w_{slot} + w_{segmentation}. \quad (24)$$

Thus, in the embodiment of Table 4:

$$\log(\mu_1) = w_{CoolPortal} + w_{slot10} + w_{freq1} \quad (25)$$
$$\log(\mu_2) = w_{CoolPortal} + w_{slot10} + w_{freq5-9}$$
$$\log(\mu_3) = w_{CoolPortal} + w_{slot21} + w_{freq1}$$
$$\vdots$$
$$\log(\mu_6) = w_{Mybook} + w_{slot10} + w_{freq5-9}$$
$$\log(\mu_7) = w_{Mybook} + w_{slot21} + w_{freq1},$$

where subscripts applied to each $\mu$ refer to the row numbers in Table 4. In this embodiment, each mean RPI, $\mu$, for Rows 1-7 has been computed through RPI distribution modeling, as described above in steps 306 and 308 of FIG. 3.

In this embodiment, step 504 computes the factors $w_{website}$, $w_{slot}$, and $w_{segmentation}$ for media cells 1-7 (or sets of media cells 1-7) in Table 4 using a least-squares approach. Once the individual factors $w_{website}$, $w_{slot}$, and $w_{segmentation}$ have been calculated, step 506 estimates the mean RPI for media cell 8 (or set of media cells 8) as:

$$\log(\mu_8) = w_{Mybook} + w_{slot21} + w_{freq5-9}. \quad (26)$$

Furthermore, step 506 estimates the mean RPI for media cell 9 (or set of media cells 9) of Table 4 as:

$$\log(\mu_9) = w_{BittyBlog} + w_{slot21} + w_{freq1}. \quad (27)$$

However, no media cell having a previously-estimated mean RPI is characterized by the "BittyBlog" website. As such, as described above for situation (iii), step 506 estimates $w_{BittyBlog}$ by averaging over the values of $w_{website}$ that have been computed by step 504. In the simplified example of Table 4, step 506 would average the values of $w_{CoolPortal}$ and $w_{Mybook}$ computed in step 504.

In other embodiments, step 504 can compute factors corresponding to hundreds of individual websites associated with media cells or sets of media cells having common revenue models and, potentially, common geographic segmentations. In such a case, the averaging process of step 506 could include factors associated with hundreds of websites. Further, although not described in the embodiment of Table 4, the averaging process of scenario (iii) of step 506 could determine any other unknown factor or plurality of factors associated with a corresponding attribute of the selected media cells, including, but not limited to, the slot and segmentation attributes of Table 4.

Further, the embodiment of Table 4 includes only two segment definitions for each media cell or set of cells. However, in additional embodiments, the processes of FIG. 5 can include any additional definition from that segment set, e.g., Frequency 2-4 and Frequency 10-19, or definitions from any additional or alternate segmentation schemes without departing from the spirit or scope of the present invention.

Additionally, method 500 is not limited to characterizations of media cells according to three tract-based attributes, as defined above. In additional embodiments, process 500 can be generalized to consider any number of attributes apparent to one skilled in the art and relevant to a specific application.

Referring back to FIG. 5, in certain embodiments, when all factors wk that describe the attributes of the selected media cells may have been computed in the presence of aliasing (i.e., scenario (ii) described above). Aliasing occurs when the regression solution is not unique. Therefore, there exists one or more sets of parameters that, once the regression is computed in step 504, produce the same resulting set of factors. These estimated parameters produce meaningful predictions only in cases that all the family members generate the same result.

In certain embodiments, aliasing will be present when the design matrix D in Equation 20 is not full column rank, i.e., design matrix D has a null space $N_D$. As such, anything from null space $N_D$ can be added to W without any impact on the model in Equation 20. Therefore, the factor estimates that obtained from the regression in step 504 are not unique, i.e., W=W+v, where v is any arbitrary vector from $N_D$.

In an embodiment, the prediction of factors for a media or set of medias on a tract of advertising space inventory can be generated by first forming a design row $d_p$ that corresponds to the tract, and then by applying $\eta_p = d_p(\mu_0 + v)$, where $\mu_0$ is a mean RPI for the media or set of medias on the tract. In this embodiment, the resulting prediction $\eta_p$ is meaningful only if it is unique. In other words, arbitrary vector v does not have any impact on $\eta_p$. Such a result may occur if $d_p$ is orthogonal to null space $N_D$. Thus, for any tract whose design vector is not orthogonal to $N_D$, step 504 may not be able to predict factors based on a logistic regression.

In such a case, if step 506 is unable to estimate the mean revenue per impression for the selected media cells using a logarithmic-linear combination of factors, step 506 can estimate the mean RPI of the selected media cells by averaging the estimated mean RPI for media cells or sets of media cells that share a maximum number of common attributes with the selected media cells.

Figure 6:
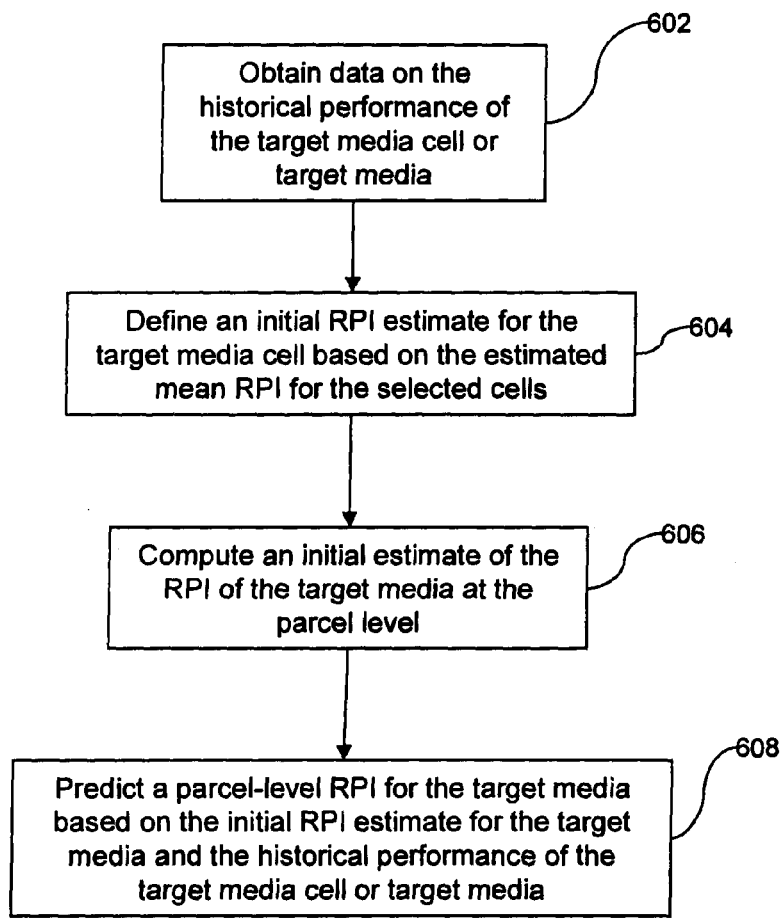
FIG. 6 is a flowchart of an exemplary method for predicting a RPI of a target media cell using data sharing, according to an embodiment of the present invention.

FIG. 6 illustrates a method 600 for predicting a revenue per impression (RPI) for a target media through data sharing, according to an embodiment of the present invention. For example, method 600 can be incorporated into step 106 of FIG. 1 to predict a RPI for a target media cell based on an estimated mean RPI for the selected media cells.

Step 602 obtains data on the historical performance of a target media cell. In an embodiment, such data includes a number of impressions received or gathered by the target media cell and a number of corresponding actions received by the target media cell or cells. In various embodiments, such data may be obtained directly through continuous measurement and monitoring of activity associated with the target media cell. Furthermore, in an embodiment, the historical data obtained in step 602 may refer to the performance of a target media across multiple target media cells, i.e., across a parcel of advertising space inventory.

Step 604 defines an initial estimate of the RPI of the target media cell as the estimated mean RPI of the selected media cells. In such an embodiment, both the initial estimate of the RPI of the target media cell and the estimated mean RPI for the selected media cells represent "tract-level" performance, as these estimates correspond to a specific tract of advertising space inventory, e.g., a particular website-slot-segment of advertising space inventory.

In an additional embodiment, steps 602 and 604 can be repeated for each target media cell associated with a particular target media. For example, a target media can be associated with multiple tracts of advertising space inventory, thereby defining multiple target media cells. As such, step 602 can obtain historical data for each target media cell, and step 604 could subsequently define an initial RPI estimate for each target media cell associated with the target media.

Step 606 rolls up the tract-level performance estimates for the target media cell or cells into "parcel-level" performance estimates. As described above, the estimated mean RPI for the selected media cells, and hence the corresponding initial performance estimate for the target media cell, may represent tract-level estimates. However, other performance measurements, including, but not limited to, historical data on the performance of the target media cell of step 602, may be based on measurements and observations across multiple target media cells, e.g., across a parcel of advertising space inventory. As such, before combining these performance metrics to predict the RPI for the target media cell, the individual tract-level RPI predictions must be rolled-up to the parcel level.

In an embodiment, a parcel of advertising space inventory can include a single tract of advertising space inventory, i.e., the parcel includes a single target media cell. In such an instance, the tract-level prediction of the initial RPI for the target media cell defined in step 604 is already a parcel-level prediction, and no additional processing occurs in step 606.

However, in an additional embodiment, a parcel can include a plurality of individual tracts. In such an instance, the parcel may be formed from multiple target media cells, each of which having a corresponding initial RPI estimate defined according to step 604. In such a case, a weighted average of the individual tract predictions is used as the parcel prediction:

$$\hat{p}_{ij}^{data-sharing} = \frac{\sum_{s \in j} \hat{p}_{is}^{data-sharing} n_s^{RTD}}{\sum_{s \in j} n_s^{RTD}}, \quad (28)$$

where $\hat{p}_{ij}^{data-sharing}$ is the parcel-level predicted RPI for media i on parcel j, while $\hat{p}^{data-sharing}$ is the tract-level initial estimate of RPI for media i on tract s within parcel j (i.e., the initial RPI for target media cell s, defined above in step 604). $n_s^{RTD}$ is the number of impressions targeted at each target media cell over a time period, for example, a two-week period.

The standard deviation of $\hat{p}_{ij}^{data\text{-}sharing}$ is rolled up from the tract-level standard deviations in the same manner:

$$\sigma_{ij}^{data\text{-}sharing} = \frac{\sum_{s \in j} \sigma_{is}^{data\text{-}sharing} n_s^{RTD}}{\sum_{s \in j} n_s^{RTD}}, \tag{29}$$

where standard deviation and variance are related as:

$$\sigma_{is}^{data\text{-}sharing} = \sqrt{\text{var}(\hat{p}_{is}^{data\text{-}sharing})}$$

$$\sigma_{ij}^{data\text{-}sharing} = \sqrt{\text{var}(\hat{p}_{ij}^{data\text{-}sharing})}. \tag{30}$$

Once step 606 defines a parcel-level estimate of the initial RPI for the target media, step 608 predicts a parcel-level RPI of the target media. In an embodiment, step 608 blends the initial, parcel-level estimate of the RPI of the target media and the historical data of the performance of the target media to compute the RPI of the target media.

These two contributions to the RPI for the target media are weighed and summed to yield the final performance prediction:

$$\hat{p}_{blended} = \frac{w_{data\text{-}sharing} \times \hat{p}_{data\text{-}sharing} + w_{cell\text{-}specific} \times \hat{p}_{cell\text{-}specific}}{w_{data\text{-}sharing} + w_{cell\text{-}specific}}, \tag{31}$$

where $\hat{p}_{blended}$ represents the final RPI of the target media at the parcel level; $\hat{p}_{data\text{-}sharing}$ represents the initial RPI of the target media at the parcel level, as obtained from Equation 28, above; and $\hat{p}_{cell\text{-}specific}$ represents historical observed performance at the target cell at the parcel level. Further, $w_{data\text{-}sharing}$ and $w_{cell\text{-}specific}$ represent, respectively, weight factors associated with $\hat{p}_{data\text{-}sharing}$ and $w_{cell\text{-}specific}$.

In the embodiment of FIG. 6, the weight given to the initial RPI of the target media and the weight given to the historical observed performance are, respectively, proportional to a variance associated with the corresponding RPIs. For example, if the variance associated with the initial RPI of the target media is larger than the variance associated with the historical observed performance, step 608 would consider the initial revenue per impression of the target cell a less reliable predictor of the final revenue per impression of the target cell. Accordingly, step 608 would weigh the initial revenue per impression of the target cell less heavily than the historical observed performance when computing the final revenue per impression for the target media cell.

In an embodiment, a weight given to the data sharing contribution, i.e., the initial RPI estimate for the target media, is:

$$w_{data\text{-}sharing} = \frac{1}{c \times \hat{p}_{data\text{-}sharing}}, \tag{32}$$

with the tunable constant c currently set to unity. Furthermore, the weight given to the cell-specific contribution, i.e., the historical observed performance of the target media, is equal to the lag-compensated number of impressions at the cell:

$$w_{cell\text{-}specific} = n_{lag\text{-}compensated}. \tag{33}$$

In an embodiment, the lag-compensated number of impressions $n_{lag\text{-}compensated}$ can be set equal to a number of impressions that have so far been awarded to the target cell.

The following examples illustrate how the blending process of FIG. 6 may predict the final RPI for the target cell. First, consider a case wherein a cell has not yet received even a single impression. At that time:

$$w_{cell\text{-}specific} = n_{lag\text{-}compensated} = 0. \tag{34}$$

In this exemplary case, the final RPI for the target media cell, as predicted in step 608, reduces to the initial RPI of the target media cell predicted in step 606, as expected.

Figure 7:
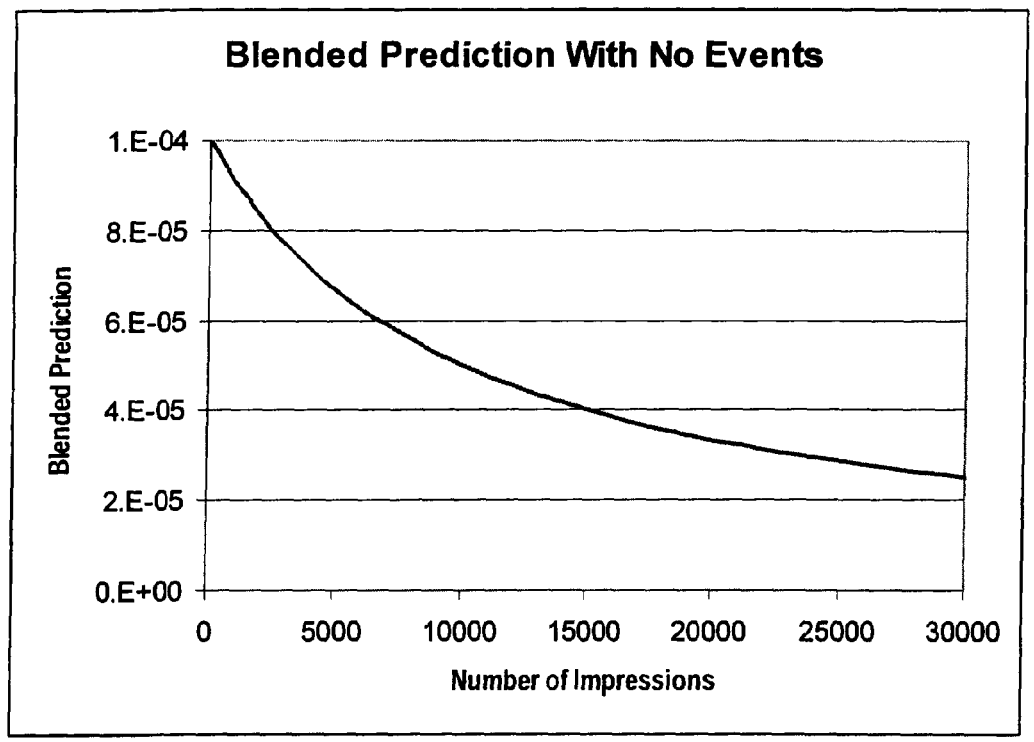
FIG. 7 is a graph of an exemplary predicted RPI for a target media cell, according to an embodiment of the present invention.

However, in another case, a target media cell receives impressions, but still does not receive any actions. When no actions have been received, the cell-specific performance estimate $\hat{p}_{cell\text{-}specific}$. Further, for exemplary purposes only, assume that an initial RPI of the target media cell (i.e., the data-sharing prediction) is 0.0001, which indicates that an action is expected on average for every 10,000 impressions shown. FIG. 7 illustrates the behavior of the prediction of the RPI for the target media cell, as computed in step 608, changes as the target cell gathers more and more impressions.

The behavior of the predicted mean RPI for the target media cell, as depicted in FIG. 7, indicates that the initial estimate of mean RPI for the target cell (i.e., the data sharing estimate) dominates the predicted mean RPI while the number of impressions gathered by the target cell remains small. However, as the number of impressions increases towards 30,000, the predicted mean RPI for the target cell declines, since the observed performance at the target cell (i.e., no action) dominates the final revenue per impression. As such, since the target cell has not gathered a single action after a large number of impressions, the mean RPI for the target cell predicted by step 608 indicates that the target cell is a poor performer.

Furthermore, as described above, the processes of FIG. 6 are not limited to parcels that include multiple tract definitions. For a parcel that includes only a single tract, the parcel-level definition of the initial RPI for the target media, as computed in step 606, is equivalent to the predicted initial estimate of the mean RPI for the target media cell, as the target media cell coincides with the parcel. As such, the resulting RPI predicted by step 608 will correspond to the RPI of the target media cell.

The underlying premise of data sharing is that similar cells will have similar performance, as measured by RPI. Thus, as outlined above in reference to FIGS. 6 and 7, observations of the performance of a group of peer cells can be used to generate performance predictions for cells with no history that substantially reduce or eliminate the bias associated with conventional performance estimates. Furthermore, data sharing can be used to enhance the performance estimates for all cells by blending cell-specific history with data from related cells, as described in step 608.

4. Exemplary Computer Systems

Figure 8:
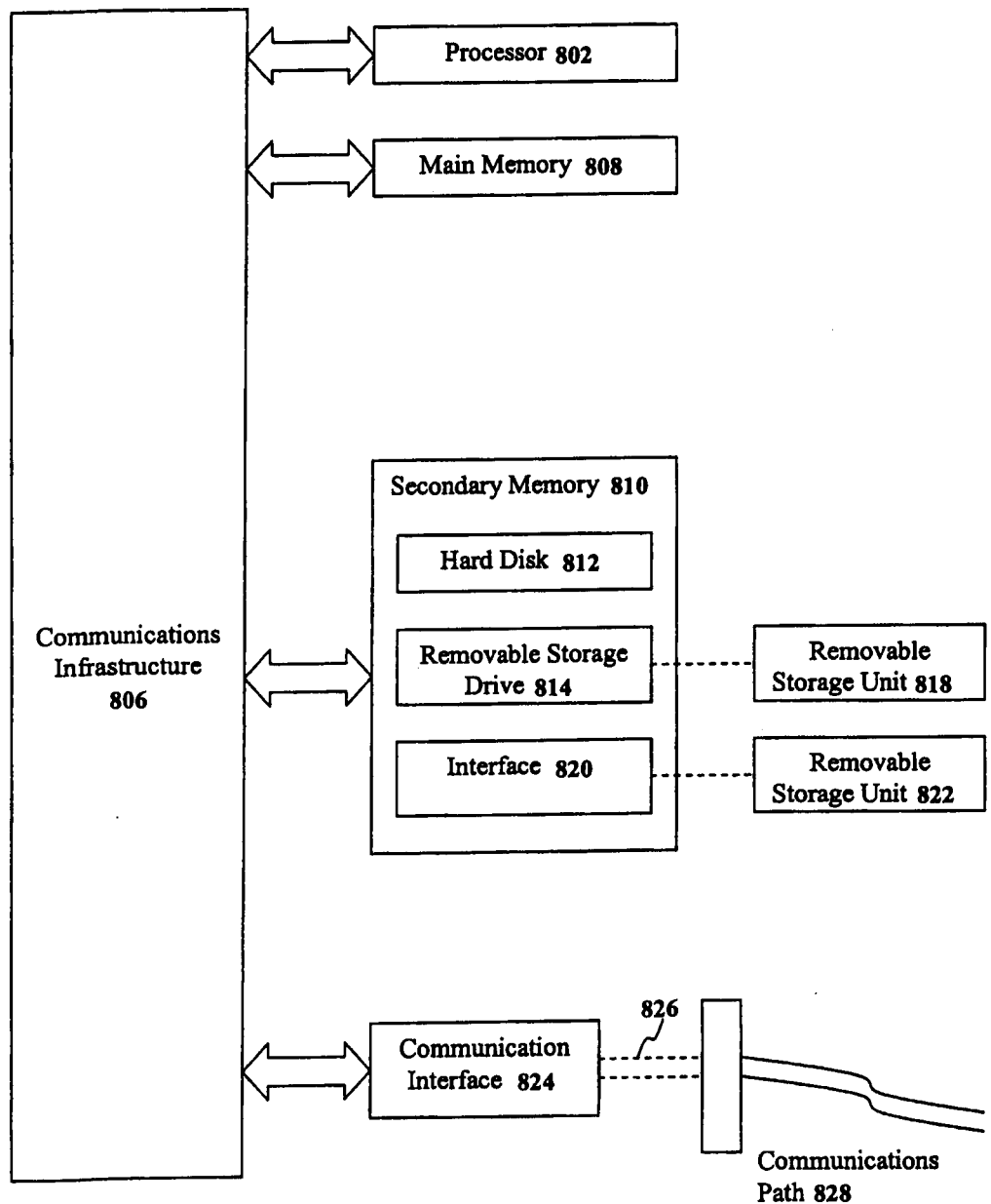
FIG. 8 is a diagram of an exemplary computer system that implements embodiments of the present invention.

FIG. 8 is an exemplary computer architecture 800 upon which the methods and systems of the present invention may be implemented, according to an embodiment of the invention. Exemplary computer system 800 includes one or more processors, such as processor 802. Processor 802 is connected to a communication infrastructure 806, such as a bus or network.

Computer system 800 also includes a main memory 808, for example, random access memory (RAM), and may include a secondary memory 810. The secondary memory 810 may include, for example, a hard disk drive 812 and/or a removable storage drive 814, representing a magnetic tape drive, an optical disk drive, CD/DVD drive, etc. The removable storage drive 814 reads from and/or writes to a removable storage unit 818 in a well-known manner. Removable storage unit 818 represents a magnetic tape, optical disk, or other storage medium that is read by and written to by removable storage drive 814. As will be appreciated, the removable storage unit 818 can represent a computer readable medium having stored therein computer programs, sets of instructions, code, or data.

In alternative implementations, secondary memory 810 may include other means for allowing computer programs or other program instructions to be loaded into computer system 800. Such means may include, for example, a removable storage unit 822 and an interface 820. An example of such means may include a removable memory chip (e.g., EPROM, RAM, ROM, DRAM, EEPROM, flash memory devices, or other volatile or non-volatile memory devices) and associated socket, or other removable storage units 822 and interfaces 820, which allow instructions and data to be transferred from the removable storage unit 822 to computer system 800.

Computer system 800 may also include one or more communications interfaces, such as communications interface 824. Communications interface 824 allows software and data to be transferred between computer system 800 and external devices. Examples of communications interface 824 may include a modem, a network interface (e.g., an Ethernet card), a communications port, a PCMCIA slot and card, etc. Software and data may be transferred via communications interface 824 in the form of signals 826, which may be electronic, electromagnetic, optical or other signals capable of being received by communications interface 824. These signals 826 are provided to communications interface 824 via a communications path (i.e., channel) 828. This channel 828 carries signals 826 and may be implemented using wire or cable, fiber optics, an RF link and other communications channels. In an embodiment of the invention, signals 826 comprise data packets sent to processor 802. Information representing processed packets can also be sent in the form of signals 826 from processor 802 through communications path 828.

The terms "storage device" and "storage medium" may refer to particular devices including, but not limited to, main memory 808, secondary memory 810, a hard disk installed in hard disk drive 812, and removable storage units 818 and 822. Further, the term "computer readable medium" may refer to devices including, but not limited to, a hard disk installed in hard disk drive 812, any combination of main memory 808 and secondary memory 810, and removable storage units 818 and 822, which respectively provide computer programs and/or sets of instructions to processor 802 of computer system 800. Such computer programs and sets of instructions can be stored within one or more computer readable mediums. Additionally or alternatively, computer programs and sets of instructions may also be received via communications interface 824 and stored one or more computer readable mediums.

Such computer programs and instructions, when executed by processor 802, enable processor 802 to perform the computer-implemented methods described above. Examples of program instructions include, for example, machine code, such as produced by a compiler, and files containing a high-level code that can be executed by processor 802 using an interpreter.

Furthermore, the computer-implemented methods described above in reference to FIGS. 1-7 can be implemented on a single processor of a computer system, such as processor 802 of system 800. However, in an additional embodiment, the computer-implemented methods of FIGS. 1-7 may be implemented using one or more processors, such as processor 802, within a single computer system, and additionally or alternatively, these computer-implemented methods may be implemented on one or more processors within separate computer systems linked via a network.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow.

Further, other embodiments of the present invention will be apparent to those skilled in the art from consideration of the specification and practice of one or more embodiments of the invention disclosed herein. It is intended that the specification and examples be considered as exemplary only, with a true scope and spirit of the invention being indicated by the following claims.

What is claimed is:

1. A computer-implemented method, comprising:
   generating an approximation to an error associated with a mean revenue per impression of a corresponding media cell, the corresponding media cell sharing one or more common attributes with a target media cell, and the error approximation being based on at least a number of impressions associated with the corresponding media cell;
   determining, with at least one processor, whether the error approximation exceeds a threshold value associated with a revenue model of the corresponding media cell;
   calculating, when the error approximation does not exceed the threshold value, the mean revenue per impression of the corresponding media cell based on a distribution of revenue per impression associated with the corresponding media cell; and
   predicting, with the at least one processor, a revenue per impression of the target media cell based on the calculated mean revenue per impression of the corresponding media cell.

2. The method of claim 1, wherein the common attributes comprise at least one of a common tract of advertising space inventory, a common revenue model, a common slot size, a common segmentation model, a common media, or a common industry campaign.

3. The method of claim 1, further comprising:
   identifying a plurality of media cells that share the one or more common attributes with the target media cell; and
   computing an approximation to an error associated with a mean revenue per impression of the identified media cells, based on at least a number of impressions associated with the identified media cells.

4. The method of claim 1, wherein the generating comprises:
   calculating a factor indicative of a revenue model of the corresponding media cell and a geographic segmentation of the corresponding media cell; and
   computing the error approximation based on at least one of the number of impressions associated with the corresponding media cell or a ratio of (i) a cost per unit of media associated with the corresponding media cell and (ii) the calculated factor.

5. The method of claim 1, wherein the calculating comprises determining the distribution of revenue per impression for the corresponding media cell based on at least one of a cost per unit of media associated with the corresponding media cell, the number of impressions associated with the corresponding media cell, or a number of events associated with the corresponding media cell.

6. The method of claim 1, further comprising:
when the error approximation exceeds the threshold value, calculating the mean revenue per impression of the corresponding media cell based on a relationship between a plurality of attributes of one or more additional media cells and an estimated mean revenue per impression of the one or more additional media cells.

7. The method of claim 6, wherein the calculating further comprises:
determining a plurality of factors that describe a relationship between the attributes of the one or more additional media cells and the estimated mean revenue per impression of the one or more additional media cells, wherein each of the plurality of factors is associated with a corresponding one of the plurality of attributes; and
calculating the mean revenue per impression of the corresponding media cell based on a logarithmic-linear combination of the plurality of factors.

8. The method of claim 6, wherein the plurality of attributes comprise at least one of a website, a slot size, or a segmentation model associated with each additional media cell.

9. The method of claim 1, wherein the predicting comprises computing a weighted average of (i) the estimated mean revenue per impression of the corresponding media cell and (ii) measurements of revenue per impression for the target media cell.

10. The method of claim 1, wherein the calculating comprises adjusting the mean revenue per impression of the corresponding media cell to account for one or more of audience leadback and advertiser leadback.

11. An apparatus, comprising:
a storage device; and
a processor coupled to the storage device, wherein the storage device stores a program for controlling the processor, and wherein the processor, being operative with the program, is configured to:
generate an approximation to an error associated with a mean revenue per impression of a corresponding media cell, the corresponding media cell sharing one or more common attributes with a target media cell, and the error approximation being based on at least a number of impressions associated with the corresponding media cell;
determine whether the error approximation exceeds a threshold value associated with a revenue model of the corresponding media cell;
calculate, when the error approximation does not exceed the threshold value, the mean revenue per impression of the corresponding media cell based on a distribution of revenue per impression associated with the corresponding media cell; and
predict a revenue per impression of the target media cell based on the calculated mean revenue per impression of the corresponding media cell.

12. The apparatus of claim 11, wherein the common attributes comprise at least one of a common tract of advertising space inventory, a common revenue model, a common slot size, a common segmentation model, a common media, or a common industry campaign.

13. The apparatus of claim 11, wherein the processor is further configured to:
calculate a factor indicative of a revenue model of the corresponding media cell and a geographic segmentation of the corresponding media cell; and
compute the error approximation based on at least one of the number of impressions associated with the corresponding media cell or a ratio of (i) a cost per unit of media associated with the corresponding media cell and (ii) the calculated factor.

14. The apparatus of claim 11, wherein the processor is further configured to determine the distribution of revenue per impression for the corresponding media cell based on at least one of a cost per unit of media associated with the corresponding media cell, the number of impressions associated with the corresponding media cell, or a number of events associated with the corresponding media cell.

15. The apparatus of claim 11, wherein the processor is further configured to:
calculate, when the error approximation exceeds the threshold value, the mean revenue per impression of the corresponding media cell based on a relationship between a plurality of attributes of one or more additional media cells and an estimated mean revenue per impression of the one or more additional media cells.

16. The apparatus of claim 15, wherein the processor is further configured to:
determine a plurality of factors that describe a relationship between the attributes of the one or more additional media cells and the estimated mean revenue per impression of the one or more additional media cells, wherein each of the plurality of factors is associated with a corresponding one of the plurality of attributes; and
calculate the mean revenue per impression of the corresponding media cell based on a logarithmic-linear combination of the plurality of factors.

17. The apparatus of claim 15, wherein the plurality of attributes comprise at least one of a website, a slot size, or a segmentation model associated with each additional media cell.

18. The apparatus of claim 11, wherein the processor is further configured to predict the revenue per impression of the target media cell based on a weighted average of (i) the estimated mean revenue per impression of the corresponding media cell and (ii) measurements of revenue per impression for the target media cell.

19. The apparatus of claim 11, wherein the processor is further configured to adjust the mean revenue per impression of the corresponding media cell to account for one or more of audience leadback and advertiser leadback.

20. A tangible, non-transitory computer readable medium storing instructions that, when executed by at least one processor, cause the at least one processor to perform a method, comprising:
generating an approximation to an error associated with a mean revenue per impression of a corresponding media cell, the corresponding media cell sharing one or more common attributes with a target media cell, and the error approximation being based on at least a number of impressions associated with the corresponding media cell;
determining whether the error approximation exceeds a threshold value, the threshold value associated with a revenue model of the corresponding media cell;
calculating, when the error approximation does not exceed the threshold value, the mean revenue per impression of the corresponding media cell based on a distribution of revenue per impression associated with the corresponding media cell; and
predicting a revenue per impression of the target media cell based on the calculated mean revenue per impression of the corresponding media cell.

* * * * *